(12) United States Patent
Young

(10) Patent No.: US 8,788,114 B2
(45) Date of Patent: Jul. 22, 2014

(54) NAVIGATION SYSTEM WITH COMPLIANCE REPORTING AND METHOD OF OPERATION THEREOF

(75) Inventor: John Lucien David Young, Seattle, WA (US)

(73) Assignee: Telenav, Inc., Sunnyvale, CA (US)

( * ) Notice: Subject to any disclaimer, the term of this patent is extended or adjusted under 35 U.S.C. 154(b) by 168 days.

(21) Appl. No.: 13/333,319

(22) Filed: Dec. 21, 2011

(65) Prior Publication Data
US 2013/0110310 A1 May 2, 2013

Related U.S. Application Data

(60) Provisional application No. 61/551,856, filed on Oct. 26, 2011.

(51) Int. Cl.
*G06Q 10/00* (2012.01)
*G06F 7/00* (2006.01)

(52) U.S. Cl.
USPC .................................. 701/1; 701/33.4; 705/4

(58) Field of Classification Search
USPC ............... 701/1, 33.4, 34.4, 123; 705/4, 7.38; 707/104.1
See application file for complete search history.

(56) References Cited

U.S. PATENT DOCUMENTS

| | | | |
|---|---|---|---|
| 5,797,135 A | 8/1998 | Whalen et al. | |
| 6,064,970 A | 5/2000 | McMillan et al. | |
| 6,868,386 B1 | 3/2005 | Henderson et al. | |
| 7,536,457 B2 | 5/2009 | Miller | |
| 7,865,378 B2 | 1/2011 | Gay | |
| 7,881,838 B2* | 2/2011 | Larschan et al. | 701/29.2 |
| 7,937,278 B1 | 5/2011 | Cripe et al. | |
| 2007/0268158 A1 | 11/2007 | Gunderson et al. | |
| 2007/0299700 A1 | 12/2007 | Gay et al. | |
| 2008/0255722 A1* | 10/2008 | McClellan et al. | 701/35 |
| 2009/0210257 A1* | 8/2009 | Chalfant et al. | 705/4 |
| 2010/0030586 A1 | 2/2010 | Taylor et al. | |
| 2010/0131304 A1 | 5/2010 | Collopy et al. | |
| 2011/0148618 A1* | 6/2011 | Harumoto et al. | 340/450 |
| 2011/0161119 A1 | 6/2011 | Collins | |
| 2012/0239462 A1* | 9/2012 | Pursell et al. | 705/7.38 |
| 2013/0013347 A1* | 1/2013 | Ling et al. | 705/4 |

OTHER PUBLICATIONS

Sensomatix, "Safety-Scoring Services for Usage Based Insurance", "Sensomatix Brochure", Feb. 2010, p. 2 pages, Publisher: Sensomatix.
State Farm, "State Farm launches new app that lets people use their smartphone to become better drivers", "PRNewswire", Apr. 28, 2011, pp. 1-3, Publisher: State Farm, Published in: Bloomington, Illinois, US, http:// multivu.prnewswire.com/mnr/statefarm/49700/.
State Farm, "State Farm Driver Feedback for iPhone", Dec. 7, 2011, pp. 1-3, Publisher: State Farm Insurance, Bloomington, Illinois, US, http://www.statefarm.com/mobile/driverfeedback/driverfeedback.asp.

* cited by examiner

*Primary Examiner* — Tan Q Nguyen
(74) *Attorney, Agent, or Firm* — IP Investment Law Group

(57) ABSTRACT

A method of operation of a navigation system includes: collecting a driving behavior for determining a driving profile of a vehicle; acquiring a compliance indicator for measuring a total usage of the vehicle; calculating a compliance level based on a monitoring usage level and the compliance indicator; generating a driving score based on the driving profile having an assessment event detected based on the driving behavior; and calculating a driving rating based on the driving score and the compliance level for displaying on a device.

20 Claims, 7 Drawing Sheets

NAVIGATION SYSTEM WITH COMPLIANCE REPORTING AND METHOD OF OPERATION THEREOF

CROSS-REFERENCE TO RELATED APPLICATION(S)

This application claims the benefit of U.S. Provisional Patent Application Ser. No. 61/551,856 filed Oct. 26, 2011, and the subject matter thereof is incorporated herein by reference thereto.

TECHNICAL FIELD

The present invention relates generally to a navigation system and more particularly to a navigation system with compliance reporting.

BACKGROUND ART

Modern portable consumer and industrial electronics, especially client devices such as smart phones, portable digital assistants, portable navigation devices, portable entertainment units, and combination devices, are providing increasing levels of functionality to support modern life, including navigation and location-based systems. Numerous technologies have been developed to utilize this new functionality including navigation profiling systems. Some of the research and development strategies focus on new technologies while others focus on improving the existing and mature technologies. Research and development in the existing technologies can take a myriad of different directions.

As users become more empowered with the growth of mobile navigation devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service. Another use of location based services to measure driving performance to alter driving performance.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

Navigation system and service providers are continually making improvements in order to be competitive. In navigation services, demand for better usability and functionality by providing additional information is increasingly important. Some navigation systems and services allow the ability to monitor location and speed. Connecting location with driving information could enable new categories of services such as predictive destination selection and improved route selection.

Thus, a need still remains for a navigation system with compliance reporting for increasing reporting and coverage quality, improving accuracy, and increasing data collection performance. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: collecting a driving behavior for determining a driving profile of a vehicle; acquiring a compliance indicator for measuring a total usage of the vehicle; calculating a compliance level based on a monitoring usage level and the compliance indicator; generating a driving score based on the driving profile having an assessment event detected based on the driving behavior; and calculating a driving rating based on the driving score and the compliance level for displaying on a device.

The present invention provides a navigation system, including: a data collection module for collecting a driving behavior for determining a driving profile; a compliance module, coupled to the data collection module, for acquiring a compliance indicator; a calculate compliance level module, coupled to the compliance module, for calculating a compliance level based on a monitoring usage level and the compliance indicator; a scoring module, coupled to the compliance module, for generating a driving score based on the driving profile having an assessment event detected based on the driving behavior; and a calculate driving rating module, coupled to the scoring module, for calculating a driving rating based on the driving score and the compliance level for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
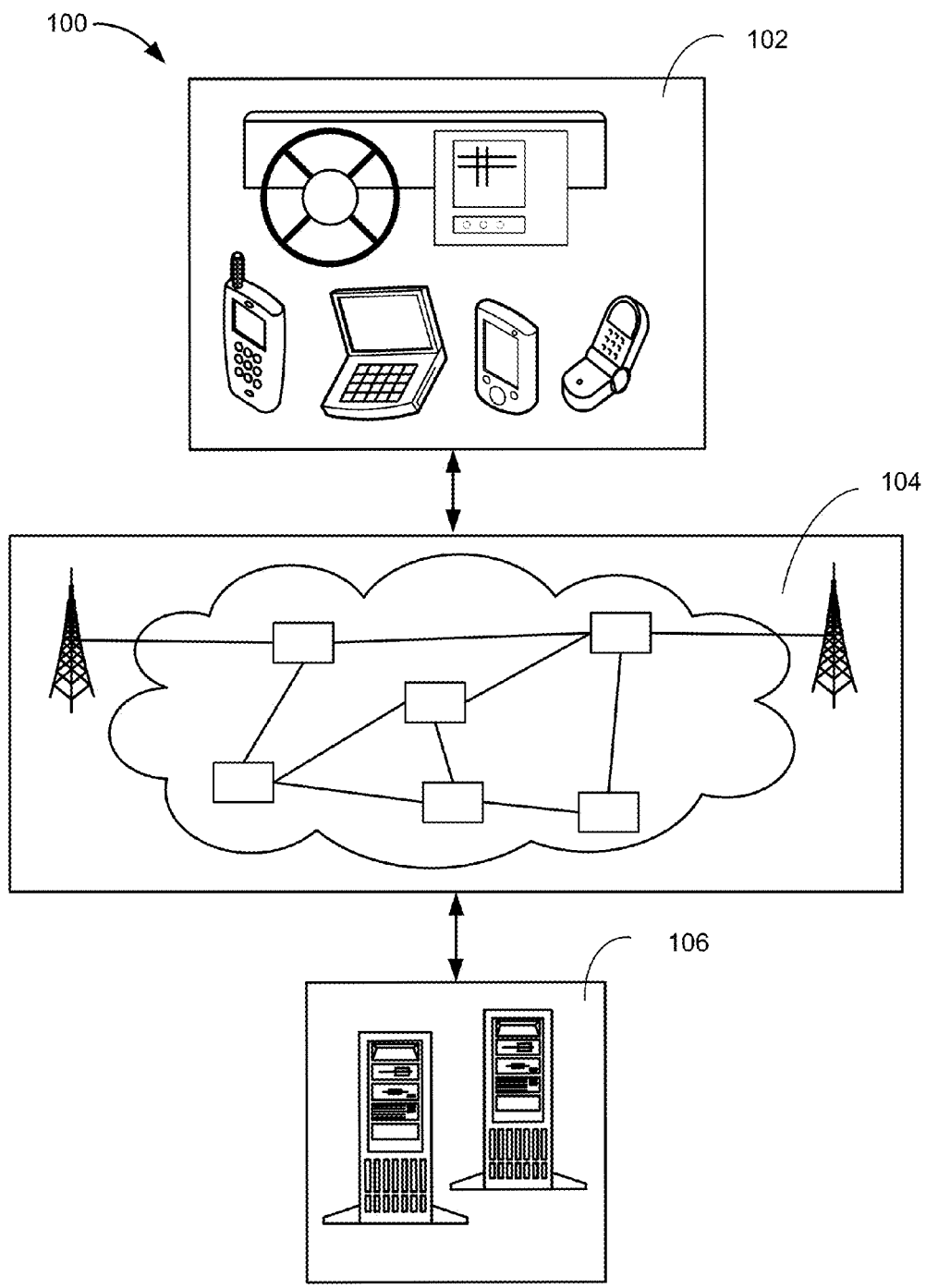
FIG. 1 is a functional block diagram of a navigation system with compliance reporting mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

In an alternative embodiment, navigation information is presented by longitude and latitude related information. In a further embodiment of the present invention, the navigation information also includes a velocity element including a speed component and a heading component.

Where multiple embodiments are disclosed and described having some features in common, for clarity and ease of illustration, description, and comprehension thereof, similar and like features one to another, will ordinarily be described with similar reference numerals. The embodiments have been numbered first embodiment, second embodiment, etc., as a matter of descriptive convenience and are not intended to have any other significance or provide limitations for the present invention.

The term "module" referred to herein can include software, hardware, or a combination thereof in the present invention in accordance with the context used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), optical components, passive devices, or a combination thereof. The term "module" represents hardware implementation as described or used later in this document, especially when used in apparatus or system claims.

Referring now to FIG. 1, therein is shown a functional block diagram of a navigation system 100 with compliance reporting mechanism in a first embodiment of the present invention. The navigation system 100 includes a first device 102, such as a client or a server, connected to a second device 106, such as a client or server, with a communication path 104, such as a wireless or wired network.

The first device 102 can be of any of a variety of mobile devices, such as a smart phone, personal digital assistant, a notebook computer, automotive navigation system, or other multi-functional mobile communication or entertainment device. The first device 102 can be a standalone device, or can be incorporated with the vehicle 216 of FIG. 2, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

The first device 102 can be a particularized machine, such as a portable computing device, a thin client, a notebook, a netbook, a smartphone, personal digital assistant, or a cellular phone, and as specific examples, an Apple iPhone™, Blackberry Torch™, or Android phone. The second device 106 can be a particularized machine, such as a mainframe, a server, a cluster server, rack mounted server, or a blade server, or as more specific examples, an HP ProLiant DL900™, or a Dell PowerEdge™ Blade Server.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with the vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
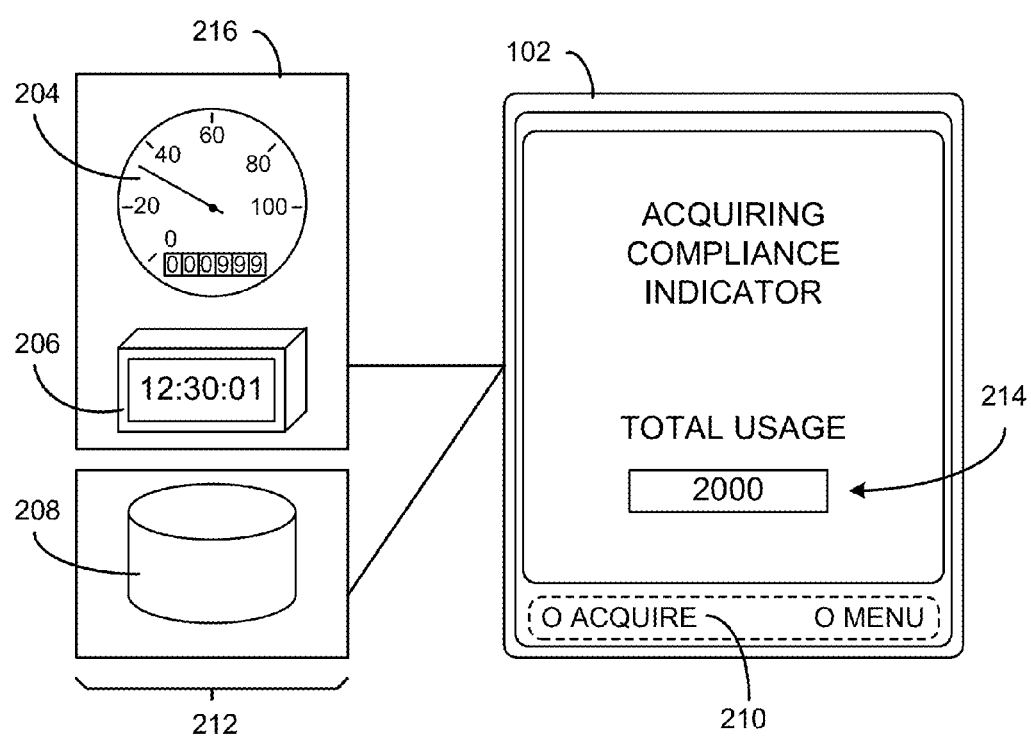
FIG. 2 is a functional block diagram of the navigation system for acquiring a compliance indicator.

Referring now to FIG. 2, therein is shown a functional block diagram of the navigation system 100 for acquiring a compliance indicator 212. The first device 102 of the navigation system 100 can acquire the compliance indicator 212 by receiving operational information about a vehicle 216 being monitored by the navigation system 100.

The compliance indicator 212 is defined as a total usage 214 of the vehicle 216 over a given time. The compliance indicator 212 can be a numeric value indicating the total usage 214 for a given time. The compliance indicator 212 can include a current mileage as provided by an odometer reading

204, an amount of time the vehicle has been operating in a given interval as provided by an operation time 206, or a combination thereof. The operation time 206 is defined as the amount of time the vehicle has been in operation over a given interval. The compliance indicator 212 can be a calculated value indicating the usage over a period of time including the mileage for a month, the operation time 206 for a quarter of a year period, or a combination thereof.

The navigation system 100 can acquire the compliance indicator 212 from a variety of sources. For example, the navigation system 100 can acquire the odometer reading 204 of the vehicle being monitored to determine the total mileage of the vehicle. The odometer reading 204 is defined as the mileage as indicated by the distance measurement unit associated in the vehicle. In another example, the navigation system 100 can measure the overall usage of the navigation system 100 by acquiring the operation time 206 of the vehicle.

In yet another example, the navigation system 100 can measure the overall usage of the navigation system 100 by acquiring the compliance indicator 212 from an external system 208. An external system 208 is defined as an information system not in the vehicle having operational information about the vehicle. An external system 208 can include a vehicle maintenance system, a vehicle registration system, a traffic data system, or a combination thereof.

The external system 208 can provide the compliance indicator 212 including the odometer reading 204 as recorded in the external system 208, the operation time 206 of the vehicle as indicated in the external system 208, or a combination thereof. In an illustrative example, the navigation system 100 can acquire the compliance indicator 212 as a mileage reading of the vehicle from the service and maintenance database of the vehicle's manufacturer.

The compliance indicator 212 can include the mileage of the vehicle at a certain point in time, the total vehicle operation time at a certain point in time, or a combination thereof. The compliance indicator 212 can also be updated to reflect the usage of the vehicle for a given period of time. For example, the compliance indicator 212 can represent the odometer reading 204 of 50,000 miles, the difference of the odometer reading 204 at the end of the month minus the odometer reading 204 at the beginning of the month, or a combination thereof. The compliance indicator 212 can represent the total usage 214 of the vehicle or the usage of the vehicle over a period of time.

The navigation system 100 can acquire the compliance indicator 212 in an automatic mode. For example, the first device 102 can automatically acquire the odometer reading 204 when the first device 102 is close enough to the odometer to form a data connection to read the odometer. In another example, the first device 102 can automatically acquire the odometer reading 204 when the navigation system 100 begins monitoring the vehicle.

In an illustrative example, the navigation system 100 can acquire the compliance indicator 212 in an interactive mode. The odometer reading 204 can be received using a user input of the first device 102. In yet another example, the first device 102 can include an acquire button 210 that can initiate the acquisition of the odometer reading 204 with a single click. The clicking of the acquire button 210 can initiate an access of the odometer to retrieve the odometer reading 204.

Figure 3:
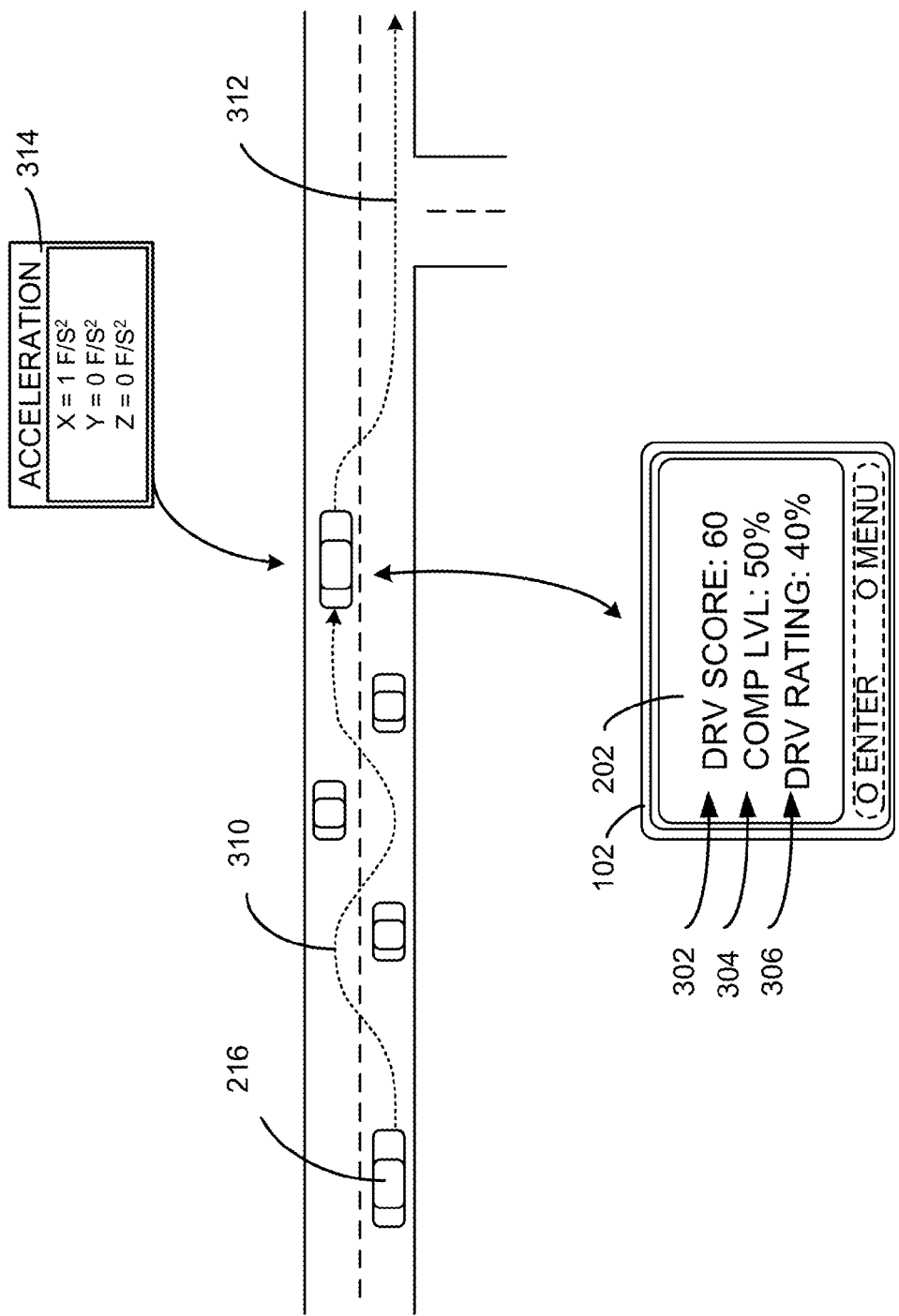
FIG. 3 is an example of a display of a first display interface.

Referring now to FIG. 3, therein is shown an example of a display of a first display interface 202. The first device 102 can display a driving score 302, a compliance level 304, and a driving rating 306 on the display of the first device 102.

The driving score 302 is defined as an indication of the level of performance of a driver (not shown) of the vehicle 216 as measured by the first device 102. For example, the driving score 302 can include a value between 0% and 100%, where 100% indicates good performance, such as driving that has smooth acceleration, easy braking, no swerving and no sharp turns.

The compliance level 304 is defined as an indication of the percent of utilization of the navigation system 100 of FIG. 1 used to measure driving performance. The compliance level 304 can indicate the percentage utilization the navigation system 100 was operated compared to overall vehicle operation.

The driving rating 306 is defined as a weighted value indicating the confidence level of the driving score 302 as scaled by the compliance level 304. The driving rating 306 can indicate the likelihood that the driving score 302 is an accurate representation of the driver's overall driving.

For example, if the driving score 302 is high, but the compliance level 304 is low, indicating that only a small portion of the driver's overall driving is monitored, then the driving rating 306 can be assigned a low value indicating that the driving score 302 may not be a good indicator of the driver's overall driving performance. If the driving score 302 is 90% and the compliance level 304 is 20%, then the driving rating 306 can indicate a value of 18% representing the driving score 302 scaled by the compliance level 304.

The driving rating 306 can be scaled in a linear or non-linear fashion. For example, if the driving score 302 is 80% and the compliance level 304 is 85%, then the driving rating 306 can be assigned a value of 80%. The driving score 306 with a value of 80% can mean that the compliance level 304 is sufficiently high to indicate that the driving score 302 is likely a good indicator of the driver's overall driving performance.

The navigation system 100 can present the driving score 302, the compliance level 304, and the driving rating 306 on the first display interface 202 of the first device 102. Presenting the driving score 302, the compliance level 304, and the driving rating 306 on the first display interface 202 can inform the driver of the vehicle 216 of his current driving performance.

The driver of the vehicle 216 having a risky driving path 310 indicating risky driving, such as excessive lane changing, can use the first device 102 to check driving performance. If the driving score 302 is 60, the compliance level 304 is 50%, and the driving rating 306 is 40%, then the driver can decide to keep monitoring his driving to increase the compliance level 304 and to alter his driving to improve the driving score 302. The driver can drive straight along a safe driving path 312 with an acceleration 314 that is smooth and low. By driving more safely, the driver can improve the driving rating 306.

It has been discovered that the present invention can provide improved driving performance and driver safety by displaying the driving score 302 and the compliance level 304 to the driver during operation. By providing feedback on the results and effect of the driver's behavior, the driver can alter their driving behavior to reduce risky driving activities. This can result in increased driving performance and increased driver safety.

Figure 4:
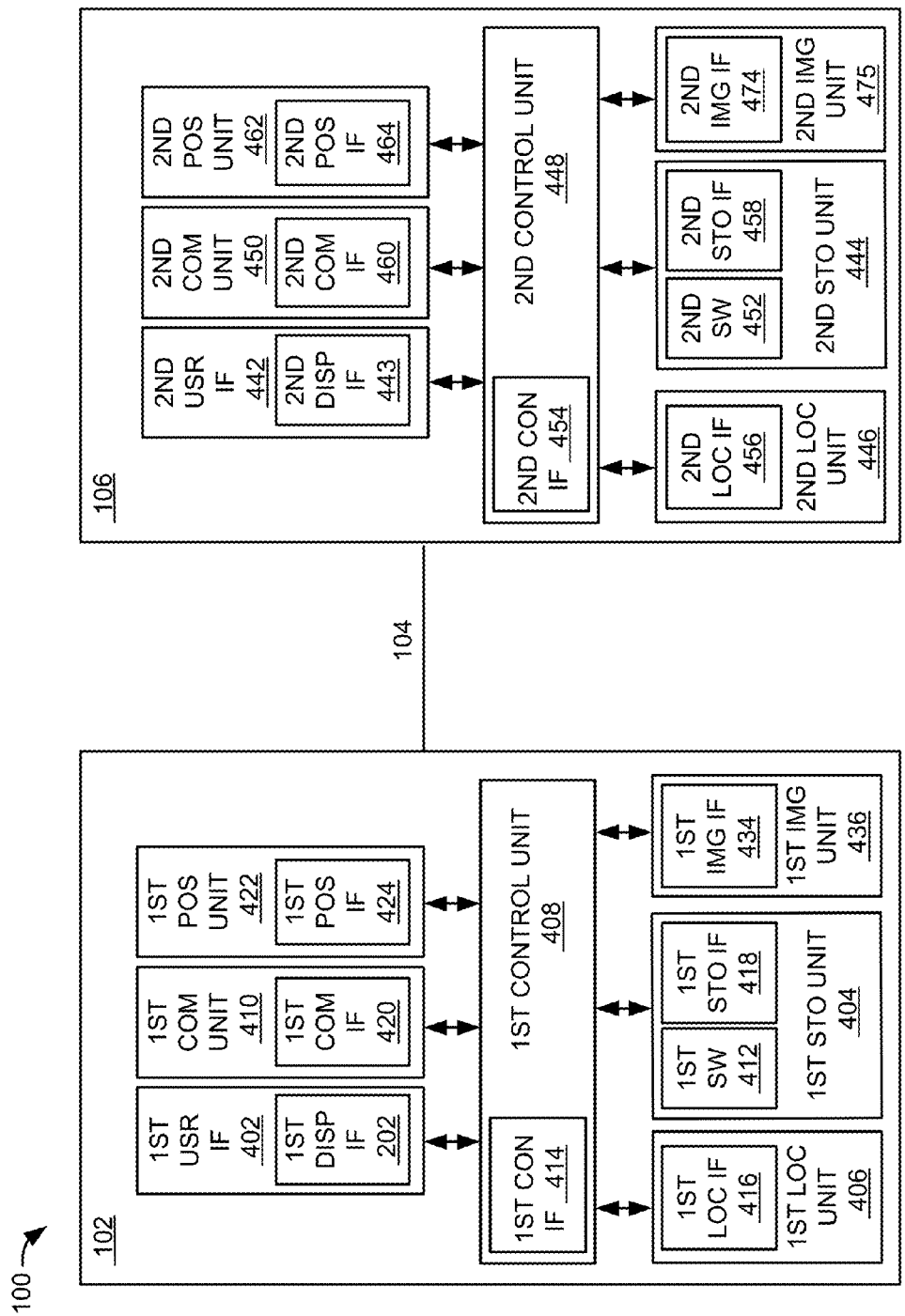
FIG. 4 is a functional block diagram of the navigation system.

Referring now to FIG. 4, therein is shown a functional block diagram of the navigation system 100. The navigation system 100 can include the first device 102, the communication path 104, and the second device 106. The first device 102 can send information over the communication path 104 to the second device 106. The second device 106 can send information over the communication path 104 to the first device 102.

The first device 102 can exchange information over the communication path 104 with the second device 106. The second device 106 can exchange information over the communication path 104 with the first device 102.

For illustrative purposes, the navigation system 100 is shown with the first device 102 as a client device, although it is understood that the navigation system 100 can have the first device 102 as a different type of device. For example, the first device can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device, such as a smart phone. The present invention is not limited to this selection for the type of devices. The selection is an example of the present invention.

The first device 102 can include a first control unit 408. The first control unit 408 can include a first control interface 414. The first control unit 408 can execute a first software 412 to provide the intelligence of the navigation system 100.

The first control unit 408 can be implemented in a number of different manners. For example, the first control unit 408 can be a processor, an embedded processor, a microprocessor, a hardware control logic, a hardware finite state machine (FSM), a digital signal processor (DSP), or a combination thereof.

The first control interface 414 can be used for communication between the first control unit 408 and other functional units in the first device 102. The first control interface 414 can also be used for communication that is external to the first device 102.

The first control interface 414 can receive information from the other functional units or from external sources, or can transmit information to the other functional units or to external destinations. The external sources and the external destinations refer to sources and destinations external to the first device 102.

The first control interface 414 can be implemented in different ways and can include different implementations depending on which functional units or external units are being interfaced with the first control interface 414. For example, the first control interface 414 can be implemented with electrical circuitry, microelectromechanical systems (MEMS), optical circuitry, wireless circuitry, wireline circuitry, or a combination thereof.

The first device 102 can include a first imaging unit 436. The first imaging unit 436 can be for capturing a digital image. The first imaging unit 436 can include a digital camera, an optical sensor, an infrared light sensor, an ultraviolet light sensor, a pinhole camera unit, or any combination thereof.

The first imaging unit 436 can include a first imaging interface 434. The first imaging interface 434 can be used for communication between the first imaging unit 436 and other functional units in the first device 102.

The first imaging interface 434 can receive information from the other functional units or from external sources, or can transmit information to the other functional units or to external destinations. The external sources and the external destinations refer to sources and destinations external to the first device 102.

The first imaging interface 434 can include different implementations depending on which functional units or external units are being interfaced with the first imaging unit 436. The first imaging interface 434 can be implemented with technologies and techniques similar to the implementation of the first control interface 414.

The first device 102 can include a first storage unit 404. The first storage unit 404 can store the first software 412. The first storage unit 404 can also store the relevant information, such as images, video, maps, profiles, sensor data, navigation information, or any combination thereof.

The first storage unit 404 can be a volatile memory, a nonvolatile memory, an internal memory, an external memory, or a combination thereof. For example, the first storage unit 404 can be a nonvolatile storage such as nonvolatile random access memory (NVRAM), Flash memory, disk storage, or a volatile storage such as static random access memory (SRAM).

The first storage unit 404 can include a first storage interface 418. The first storage interface 418 can be used for communication between the first storage unit 404 and other functional units in the first device 102. The first storage interface 418 can also be used for communication that is external to the first device 102.

The first storage interface 418 can receive information from the other functional units or from external sources, or can transmit information to the other functional units or to external destinations. The external sources and the external destinations refer to sources and destinations external to the first device 102.

The first storage interface 418 can include different implementations depending on which functional units or external units are being interfaced with the first storage unit 404. The first storage interface 418 can be implemented with technologies and techniques similar to the implementation of the first control interface 414.

The first device 102 can include a first communication unit 410. The first communication unit 410 can be for enabling external communication to and from the first device 102. For example, the first communication unit 410 can permit the first device 102 to communicate with the second device 106, an attachment, such as a peripheral device or a computer desktop, and the communication path 104.

The first communication unit 410 can also function as a communication hub allowing the first device 102 to function as part of the communication path 104 and not limited to be an end point or terminal unit to the communication path 104. The first communication unit 410 can include active and passive components, such as microelectronics or an antenna, for interaction with the communication path 104.

The first communication unit 410 can include a first communication interface 420. The first communication interface 420 can be used for communication between the first communication unit 410 and other functional units in the first device 102. The first communication interface 420 can receive information from the other functional units or can transmit information to the other functional units.

The first communication interface 420 can include different implementations depending on which functional units are being interfaced with the first communication unit 410. The first communication interface 420 can be implemented with technologies and techniques similar to the implementation of the first control interface 414.

The first device 102 can include a first user interface 402. The first user interface 402 allows a user (not shown) to interface and interact with the first device 102. The first user interface 402 can include a first user input (not shown). The first user input can include buttons, sliders, knobs, virtual buttons, voice recognition controls, or any combination thereof.

The first user interface 402 can include the first display interface 202. The first display interface 202 can allow the user to interact with the first user interface 402. The first display interface 202 can include a display, a video screen, a speaker, or any combination thereof. The first display interface 202 can be used to present the driving score 302 of FIG. 3, the compliance level 304 of FIG. 3, the driving rating 306 of FIG. 3, or a combination thereof.

The first control unit 408 can operate with the first user interface 402 to display information generated by the navigation system 100 on the first display interface 202. The first control unit 408 can also execute the first software 412 for the other functions of the navigation system 100, including receiving display information from the first storage unit 404 for display on the first display interface 202. The first control unit 408 can further execute the first software 412 for interaction with the communication path 104 via the first communication unit 410.

The first device 102 can include a first location unit 406. The first location unit 406 can provide the location of the first device 102. The first location unit 406 can access location information, current heading, and current speed of the first device 102, as examples.

The first location unit 406 can be implemented in many ways. For example, the first location unit 406 can function as at least a part of a global positioning system, an inertial navigation system, a cellular-tower location system, a pressure location system, or any combination thereof.

The first location unit 406 can include a first location interface 416. The first location interface 416 can be used for communication between the first location unit 406 and other functional units in the first device 102. The first location interface 416 can also be used for communication that is external to the first device 102.

The first location interface 416 can receive information from the other functional units or from external sources, or can transmit information to the other functional units or to external destinations. The external sources and the external destinations refer to sources and destinations external to the first device 102.

The first location interface 416 can include different implementations depending on which functional units or external units are being interfaced with the first location unit 406. The first location interface 416 can be implemented with technologies and techniques similar to the implementation of the first control interface 414.

The first device 102 can include a first position unit 422. The first position unit 422 can provide the position, motion, and orientation of the first device 102. The first position unit 422 can access position information of the first device 102 including tilt, angle, direction, orientation, rotation, motion, acceleration, or a combination thereof.

The first position unit 422 can be implemented in many ways. For example, the first position unit 422 can be an accelerometer, a gyroscopic system, a MEMS system, an electrical contact system, an optical orientation system, a triangulating system, or a combination thereof. In another example, the first position unit 422 can detect the acceleration associated with tight turns, hard braking, fast starts, or a combination thereof.

The first position unit 422 can include a first position interface 424. The first position interface 424 can be used for communication between the first position unit 422 and other functional units in the first device 102. The first position interface 424 can also be used for communication that is external to the first device 102.

The first position interface 424 can receive information from the other functional units or from external sources, or can transmit information to the other functional units or to external destinations. The external sources and the external destinations refer to sources and destinations external to the first device 102.

The first position interface 424 can include different implementations depending on which functional units or external units are being interfaced with the first position unit 422. The first position interface 424 can be implemented with technologies and techniques similar to the implementation of the first control interface 414.

For illustrative purposes, the first device 102 can be partitioned having the first user interface 402, the first storage unit 404, the first control unit 408, and the first communication unit 410, although it is understood that the first device 102 can have a different partition. For example, the first software 412 can be partitioned differently such that some or all of its function can be in the first control unit 408 and the first communication unit 410. Also, the first device 102 can include other functional units (not shown) in FIG. 4 for clarity.

The navigation system 100 can include the second device 106. The second device 106 can be optimized for implementing the present invention in a multiple device embodiment with the first device 102. The second device 106 can provide the additional or higher performance processing power compared to the first device 102.

The second device 106 can include a second control unit 448. The second control unit 448 can include a second control interface 454. The second control unit 448 can execute a second software 452 to provide the intelligence of the navigation system 100.

The second control unit 448 can be implemented in a number of different manners. For example, the second control unit 448 can be a processor, an embedded processor, a microprocessor, a hardware control logic, a hardware finite state machine (FSM), a digital signal processor (DSP), or a combination thereof.

The second control interface 454 can be used for communication between the second control unit 448 and other functional units in the second device 106. The second control interface 454 can also be used for communication that is external to the second device 106.

The second control interface 454 can receive information from the other functional units or from external sources, or can transmit information to the other functional units or to external destinations. The external sources and the external destinations refer to sources and destinations external to the second device 106.

The second control interface 454 can be implemented in different ways and can include different implementations depending on which functional units or external units are being interfaced with the second control interface 454. For example, the second control interface 454 can be implemented with electrical circuitry, microelectromechanical systems (MEMS), optical circuitry, wireless circuitry, wireline circuitry, or a combination thereof.

The second device 106 can include a second imaging unit 475. The second imaging unit 475 can capture a digital image. The second imaging unit 475 can include a digital camera, an optical sensor, an infrared light sensor, an ultraviolet light sensor, a pinhole camera unit, or any combination thereof.

The second imaging unit 475 can include a second imaging interface 474. The second imaging interface 474 can be used for communication between the second imaging unit 475 and other functional units in the second device 106.

The second imaging interface 474 can receive information from the other functional units or from external sources, or can transmit information to the other functional units or to external destinations. The external sources and the external destinations refer to sources and destinations external to the second device 106.

The second imaging interface 474 can include different implementations depending on which functional units or external units are being interfaced with the second imaging unit 475. The second imaging interface 474 can be implemented with technologies and techniques similar to the implementation of the second control interface 454.

The second device 106 can include a second storage unit 444. The second storage unit 444 can store the second software 452. The second storage unit 444 can also store the relevant information, such as images, video, maps, profiles, sensor data, navigation information, or any combination thereof.

The second storage unit 444 can be a volatile memory, a nonvolatile memory, an internal memory, an external memory, or a combination thereof. For example, the second storage unit 444 can be a nonvolatile storage such as non-volatile random access memory (NVRAM), Flash memory, disk storage, or a volatile storage such as static random access memory (SRAM).

The second storage unit 444 can include a second storage interface 458. The second storage interface 458 can be used for communication between the second storage unit 444 and other functional units in the second device 106. The second storage interface 458 can also be used for communication that is external to the second device 106.

The second storage interface 458 can receive information from the other functional units or from external sources, or can transmit information to the other functional units or to external destinations. The external sources and the external destinations refer to sources and destinations external to the second device 106.

The second storage interface 458 can include different implementations depending on which functional units or external units are being interfaced with the second storage unit 444. The second storage interface 458 can be implemented with technologies and techniques similar to the implementation of the second control interface 454.

The second device 106 can include a second communication unit 450. The second communication unit 450 can enable external communication to and from the second device 106. For example, the second communication unit 450 can permit the second device 106 to communicate with the first device 102, an attachment, such as a peripheral device or a computer desktop, and the communication path 104.

The second communication unit 450 can also function as a communication hub allowing the second device 106 to function as part of the communication path 104 and not limited to be an end point or terminal unit to the communication path 104. The second communication unit 450 can include active and passive components, such as microelectronics or an antenna, for interaction with the communication path 104.

The second communication unit 450 can include a second communication interface 460. The second communication interface 460 can be used for communication between the second communication unit 450 and other functional units in the second device 106. The second communication interface 460 can receive information from the other functional units or can transmit information to the other functional units.

The second communication interface 460 can include different implementations depending on which functional units are being interfaced with the second communication unit 450. The second communication interface 460 can be implemented with technologies and techniques similar to the implementation of the second control interface 454.

The second device 106 can include a second user interface 442. The second user interface 442 allows a user (not shown) to interface and interact with the second device 106. The second user interface 442 can include a second user input (not shown). The second user input can include buttons, sliders, knobs, virtual buttons, voice recognition controls, or any combination thereof.

The second user interface 442 can include a second display interface 443. The second display interface 443 can allow the user to interact with the second user interface 442. The second display interface 443 can include a display, a video screen, a speaker, or any combination thereof. The second display interface 443 can be used to present the driving score 302, the compliance level 304, the driving rating 306, or a combination thereof.

The second control unit 448 can operate with the second user interface 442 to display information generated by the navigation system 100 on the second display interface 443. The second control unit 448 can also execute the second software 452 for the other functions of the navigation system 100, including receiving display information from the second storage unit 444 for display on the second display interface 443. The second control unit 448 can further execute the second software 452 for interaction with the communication path 104 via the second communication unit 450.

The second device 106 can include a second location unit 446. The second location unit 446 can provide the location of the second device 106. The second location unit 446 can access location information, current heading, and current speed of the second device 106, as examples.

The second location unit 446 can be implemented in many ways. For example, the second location unit 446 can function as at least a part of a global positioning system, an inertial navigation system, a cellular-tower location system, a pressure location system, or any combination thereof.

The second location unit 446 can include a second location interface 456. The second location interface 456 can be used for communication between the second location unit 446 and other functional units in the second device 106. The second location interface 456 can also be used for communication that is external to the second device 106.

The second location interface 456 can receive information from the other functional units or from external sources, or can transmit information to the other functional units or to external destinations. The external sources and the external destinations refer to sources and destinations external to the second device 106.

The second location interface 456 can include different implementations depending on which functional units or external units are being interfaced with the second location unit 446. The second location interface 456 can be implemented with technologies and techniques similar to the implementation of the second control interface 454.

The second device 106 can include a second position unit 462. The second position unit 462 can provide the position, motion, and orientation of the second device 106. The second position unit 462 can access position information of the second device 106 including tilt, angle, direction, orientation, rotation, motion, acceleration, or a combination thereof.

The second position unit 462 can be implemented in many ways. For example, the second position unit 462 can be an accelerometer, a gyroscopic system, a MEMS system, an electrical contact system, an optical orientation system, a triangulating system, or a combination thereof. In another example, the second position unit 462 can be for detecting the acceleration associated with tight turns, hard braking, fast starts, or a combination thereof.

The second position unit 462 can include a second position interface 464. The second position interface 464 can be used for communication between the second position unit 462 and other functional units in the second device 106. The second position interface 464 can also be used for communication that is external to the second device 106.

The second position interface 464 can receive information from the other functional units or from external sources, or can transmit information to the other functional units or to external destinations. The external sources and the external destinations refer to sources and destinations external to the second device 106.

The second position interface 464 can include different implementations depending on which functional units or external units are being interfaced with the second position unit 462. The second position interface 464 can be implemented with technologies and techniques similar to the implementation of the second control interface 454.

For illustrative purposes, the second device 106 can be partitioned having the second user interface 442, the second storage unit 444, the second control unit 448, and the second communication unit 450, although it is understood that the second device 106 can have a different partition. For example, the second software 452 can be partitioned differently such that some or all of its function can be in the second control unit 448 and the second communication unit 450. Also, the second device 106 can include other functional units (not shown) in FIG. 4 for clarity.

The functional units in the first device 102 can work individually and independently of the other functional units. For illustrative purposes, the navigation system 100 is described by operation of the first device 102. It is understood that the first device 102 can operate any of the modules and functions of the navigation system 100. For example, the first device 102 can be described to operate the first control unit 408.

The functional units in the second device 106 can work individually and independently of the other functional units. For illustrative purposes, the navigation system 100 can be described by operation of the second device 106. It is understood that the second device 106 can operate any of the modules and functions of the navigation system 100. For example, the second device 106 is described to operate the second control unit 448.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the first control unit 408, although it is understood that the second device 106 can also operate the first control unit 408.

Figure 5:
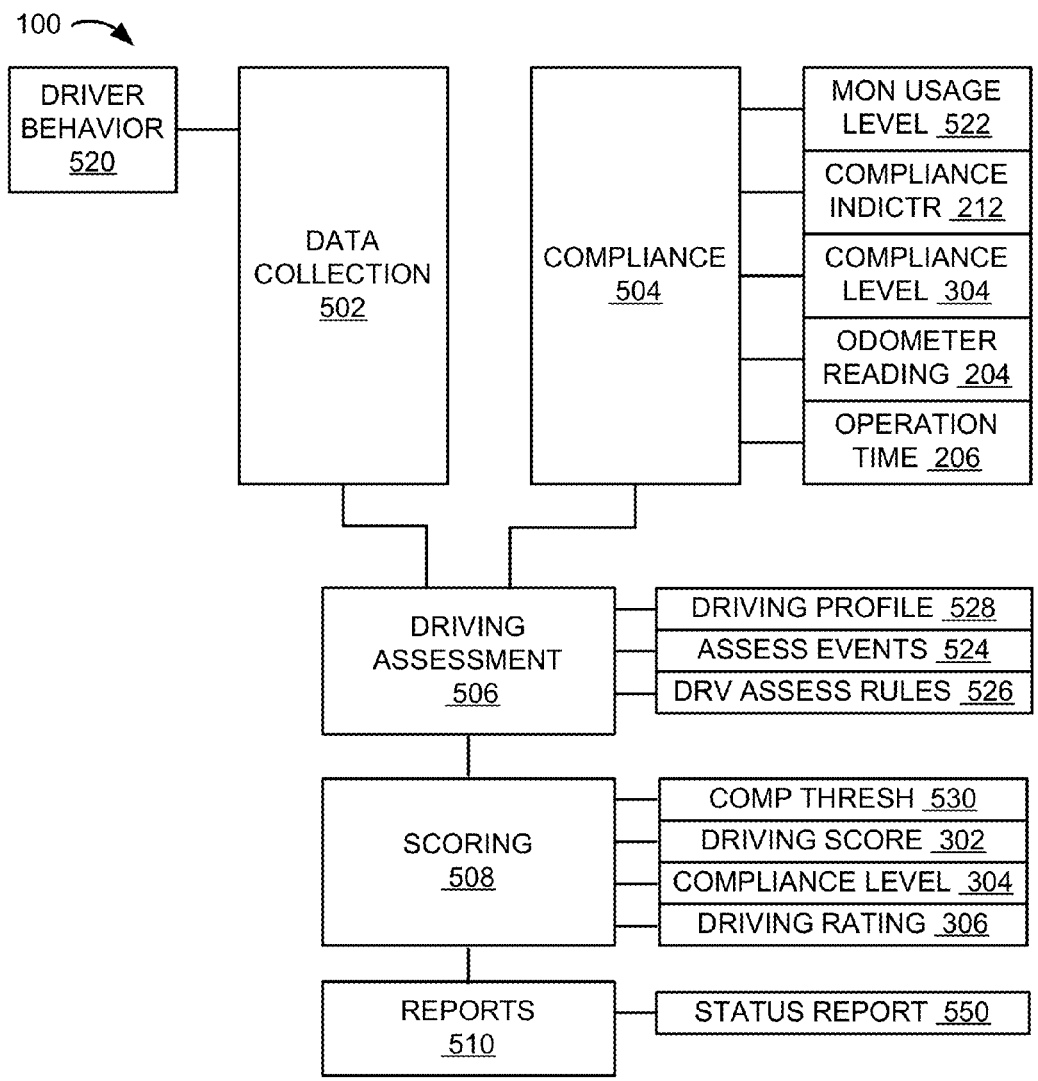
FIG. 5 is a control flow of the navigation system.

Referring now to FIG. 5, therein is shown a control flow of the navigation system 100. The navigation system 100 can collect operating information for a driver (not shown) and the vehicle 216 of FIG. 2, calculate the compliance level 304, generate the driving score 302, and present the driving rating 306. The navigation system 100 can include a data collection module 502, a compliance module 504, a driving assessment module 506, a scoring module 508, and a reports module 510.

In the control flow of the navigation system 100, as an example, each module is indicated by a number and successively higher module numbers follow one another. The control flow can pass from one module to the next higher numbered module unless explicitly otherwise indicated. The modules can be implemented as hardware, as hardware acceleration functional units in the first device or the second device, or as hardware acceleration functional units within the first control unit or the second control unit.

The navigation system 100 can include the data collection module 502. The data collection module 502 collects sensor information for determining a driving behavior 520 during the operation of the vehicle 216 of FIG. 2. After the data collection module 502 has completed, the control flow can be transferred to the driving assessment module 506.

The driving behavior 520 is defined as the driving operations performed by the driver of the vehicle. For example, the data collection module 502 can determine the driving behavior 520 by collecting accelerometer and GPS information from the first device 102 of FIG. 1 to measure acceleration, braking, turns, or a combination thereof. The driving behavior 520 can include event information from vehicle controls, instruments, and other systems. The driving behavior 520 can be a set of all location, acceleration, and other events detected by the first device 102.

The data collection module 502 can collect the sensor information in a variety of ways. For example, the data collection module 502 can collect location information from the first device 102 to determine speed, location, distance travelled, or a combination thereof. In another example, the data collection module 502 can determine the location and motion of the first device 102 using a cellular phone tower triangulation system. In yet another example, the data collection module 502 can receive, collate, and process the sensor information.

The first device 102 can detect the driving behavior 520 including speeding, hard braking, sharp turns, or a combination thereof. In another example, the data collection module 502 can collect driver information from an on-board telematics system.

The navigation system 100 can include the compliance module 504. The compliance module 504 acquires the compliance indicator 212 and a monitoring usage level 522 for calculating the compliance level 304 of the navigation system 100. The compliance level 304 can measure the overall usage of the navigation system 100 as compared to the total usage 214 of FIG. 2 of the vehicle. The compliance module 504 and the data collection module 502 can operate in parallel.

After the compliance module 504 has completed, the control flow can be transferred to the driving assessment module 506. Both the data collection module 502 and the compliance module 504 can pass the control flow to the driving assessment module 506.

The compliance indicator 212 can include a measurement of mileage, operation time, or a combination thereof. For example, the compliance indicator 212 can include the odometer reading 204 of the vehicle, the operation time 206 of the vehicle, or a combination thereof.

The monitoring usage level 522 can include a measurement of the mileage or operating time of the vehicle while being monitored by the navigation system 100. The monitoring usage level 522 is defined as an indication of the operational utilization of the navigation system 100 over a given interval. For example, the monitoring usage level 522 can indicate the mileage driven or operating time of the vehicle while being monitored by the data collection module 502 of the navigation system 100.

In another example, the monitoring usage level 522 can indicate the operation time 206 of the vehicle while being monitored by the data collection module 502. The monitoring usage level 522 can be for a given interval, such as a month, quarter, year, or other interval.

In an illustrative example, the compliance level 304 can indicate the total number of miles driven while being monitored by the navigation system 100 as compared to the total number of miles driven. By comparing the number of miles driven while monitored to the total miles driven, the compliance level 304 can indicate the likelihood that the driver's performance while being monitored is representative of his overall driving. If the vehicle has been operated for one thousand miles and the navigation system 100 has only monitored two hundred miles, then the compliance level 304 can be calculated as 200/1000=20%. The compliance level 304 of 20% can indicate that the driver's performance while being monitored may not be an accurate representation of his overall driving behavior because of the low level of compliance.

In another illustrative example, the compliance level 304 can indicate the total amount of time driven while being monitored by the navigation system 100 as compared to the total amount of time of vehicle operation. Calculating the compliance level 304 based on the operating time can indicate the likelihood that the driver's performance is representative of his overall driving.

The navigation system 100 can include the driving assessment module 506. The driving assessment module 506 analyzes the driving behavior 520 collected by the data collection module 502 to identify assessment events 524. After the driving assessment module 506 has completed, the control flow can be transferred to the scoring module 508.

The assessment events 524 are defined as activities that influence the risk associated with driving. The assessment events 524 can include events that increase the risk of driving such as speeding, hard braking, sudden turns, acceleration, swerving, driving stability, or a combination thereof. The assessment events 524 can include events that decrease the risk of driving, such as driving at the speed limit, braking smoothly, making gradual turn, seat belt usage, or a combination thereof.

For example, the assessment events 524 can include the driving behavior 520 with alternating lateral acceleration while travelling at a high speed on a freeway location. One of the assessment events 524 can be identified as risky behavior for excessive lane changing.

The assessment events 524 can include multiple driving activities in the driving behavior 520. For example, the assessment events 524 can include a series of driving activities in the driving behavior 520 including the multiple actions of even braking, gradual deceleration, and coming to a full stop when approaching a stop sign. One of the assessment events 524 can indicate risk decreasing behavior for safely stopping at a stop sign.

In another example, the assessment events 524 can include control usage and safety feature activities. This can include actions such as turn signal usage, seat belt usage, headlight usage, windshield wiper usage, or a combination thereof. For example, the first device 102 can detect the usage of the headlights at dusk to indicate one of the assessment events 524 for safe twilight driving.

The driving assessment module 506 can implement a driving assessment model using driving assessment rules 526 to analyze the driving behavior 520. The driving assessment rules 526 are defined as criteria or patterns used to identify risk-related actions based on the driving behavior 520.

For example, the driving assessment rules 526 can include a pattern that identifies acceleration above 32 feet per second squared following a full stop as one the assessment events 524. In another example, the driving assessment rules 526 can include a pattern that identifies speed above twenty-five miles per hour in a location adjacent to a school at 8:00 AM in the morning as one of the assessment events 524 of speeding in a school zone. In yet another example, the assessment events 524 can include the pattern for detecting latching of the seat belt buckle to indicate one of the assessment events 524 for seat belt usage.

The driving assessment module 506 can generate a driving profile 528 by identifying assessment events 524 based on the sensor data from the data collection module 502 by applying the driving assessment rules 526. The driving profile 528 is defined as the set of the assessment events 524.

The driving profile 528 can be for a particular period of time. The driving profile 528 can be for a particular vehicle in cases in which the driver may operate more than one vehicle. The driving profile 528 can be for a particular driver.

In an illustrative example, the driving assessment module 506 can support multiple sets of the driving assessment rules 526. The driving assessment module 506 can apply the driving assessment rules 526 to determine if the driving behavior 520 from the data collection module 502 corresponds to criteria for safe driving.

The navigation system 100 can include the scoring module 508. The scoring module 508 combines the information from the compliance module 504 and the driving assessment module 506 to generate the driving score 302 and the driving rating 306. After the scoring module 508 has completed, the control flow can be transferred to the reports module 510.

The scoring module 508 can generate the driving score 302 based on the driving profile 528. The driving score 302 can indicate how safely the vehicle is being operated as measured by the driving assessment rules 526 of the driving assessment module 506. The driving score 302 can be generated by combining the positive and negative types of the assessment events 524.

The driving score 302 can be generated based on the driving profile 528 in a variety of ways. For example, the driving score 302 can be generated by summing the weighted values of the assessment events 524, comparing the types of the assessment events 524, multiplying the assessment events 524 by a scaling factor, applying a risk assessment model to the assessment events 524, or a combination thereof.

The driving score 302 can range from 0% to 100%, where 100% indicates very good driving performance. Good driving performance can include driving that has smooth acceleration, easy braking, no swerving and no sharp turns.

In an illustrative example, if the driving profile 528 indicates ten of the assessment events 524 with risky driving activity and two of the assessment events 524 with safe driving activity, then the driving score 302 can be set lower to indicate poor driving performance. If the driving profile 528 includes the assessment events 524 indicating five or more incidents of speeding in a one month period, then the driving score 302 can be assigned to a low value, such as 30%.

In another illustrative example, if the driving profile 528 includes two of the assessment events 524 indicating risky behavior and ten of the assessment events 524 indicating safe driving, then the driving score 302 can bet set to 80% to indicate good driving performance. If the driving profile 528 indicates only one incident of speeding at less than five miles over the speed limit in a one month period and ten incidents of safe seat belt usage, then the driving score can be assigned to 90%.

The driving rating 306 can be calculated in a variety of ways. For example, the driving rating 306 can be the result of the driving score 302 scaled by the compliance level 304. The driving rating 306 can represent the estimated accuracy of the driving score 302.

In another example, the driving rating 306 can be scaled based on the driving score 302 and the comparison of the compliance level 304 to a compliance threshold 530. The compliance threshold 530 is defined as a minimum level of compliance required for the driving rating 306 to be the same as the driving score 302. The compliance level 304 can meet or exceed the compliance threshold 530 if the compliance level 304 is greater than or equal to the compliance threshold 530.

The compliance threshold 530 can be varied to provide different bands of compliance. For example, the compliance threshold 530 can be set to 90% to require high levels of compliance for known risky drivers. In another example, the compliance threshold 530 can be set to 70% to require a lower level of compliance for known good drivers.

The navigation system 100 can include the reports module 510. The reports module 510 generates reports and provide information about the driving score 302, the driving rating 306, the compliance level 304, the driving profile 528, the driving behavior 520, or a combination thereof. The reports module 510 can display information on the first device 102 for immediate feedback and can generate reports for external data systems.

The reports module 510 can generate reports in a variety of ways. The reports module 510 can provide information for individual driver usage and for long term reporting. For example, the reports module 510 can present the driving score 302, the compliance level 304, and the driving rating 306 on the first device 102 to provide real-time feedback of driving performance. The driver can use feedback from the driving score 302 and the driving rating 306 to drive more safely The driver can use feedback from the compliance level 304 to decide to drive with the navigation system 100 monitoring the driving behavior 520.

In another example, the reports module 510 can send a status report 550 including the driving score 302, the compliance level 304, the driving rating 306, the driving behavior 520, or a combination thereof, to an external system. The status report 550 can provide the external system 208 of FIG. 2 with detailed information about driving performance which can be used to select advertisements, make offers, determine sales promotion qualification, or a combination thereof.

The reports module 510 can use information provided by the data collection module 502, the compliance module 504, the driving assessment module 506, and the scoring module 508 to generate the reports. The reports module 510 can process information including the driving score 302, the compliance level 304, the driving rating 306, the driving profile 528, the assessment events 524, and other driving behavior data from the data collection module 502.

The physical transformation of displaying the driving score 302 and the compliance level 304 includes changes in driving performance resulting in movement in the physical world, such as people using the first device 102, the vehicle, or a combination thereof, based on the operation of the navigation system 100. As the movement in the physical world occurs, the movement itself creates additional information that is converted back to assist in updating the compliance level 304. This supports the continued operation of the navigation system 100 and to continue the movement in the physical world.

The first software 412 of FIG. 4 of the first device 102 can include the navigation system 100. For example, the first software 412 can include the data collection module 502, the compliance module 504, the driving assessment module 506, the scoring module 508, and the reports module 510.

The first control unit 408 of FIG. 4 can execute the first software 412 of FIG. 4 for the data collection module 502 to gather the sensor data to determine the driving behavior 520 including the acceleration, position, velocity, control usage, or a combination thereof. The first position unit 422 of FIG. 4 and the first location unit 406 of FIG. 4 can provide acceleration and location information respectively. The first control unit 408 can execute the first software 412 for the compliance module 504 to gather the compliance indicator 212, such as the odometer reading 204, the operation time 206, or a combination thereof.

The first control unit 408 can execute the first software 412 for the driving assessment module 506 to generate the driving profile 528 including the assessment events 524 based on the driving behavior 520. The first control unit 408 can execute the first software 412 for the scoring module 508 to generate the driving score 302, the compliance level 304, and the driving rating 306. The first control unit 408 can execute the first software 412 for the reports module 510 to generate reports and display the driving score 302, the compliance level 304, and the driving rating 306.

The second software 452 of FIG. 4 of the second device 106 of FIG. 4 can include the navigation system 100. For example, the second software 452 can include the data collection module 502, the compliance module 504, the driving assessment module 506, the scoring module 508, and the reports module 510.

The second control unit 448 of FIG. 4 can execute the second software 452 for the data collection module 502 to gather the sensor data to determine the driver's behavior including the acceleration, position, velocity, control usage, or a combination thereof. The second control unit 448 can execute the second software 452 for the compliance module 504 to gather the compliance indicator 212, such as the odometer reading 204, the operation time 206, or a combination thereof.

The second control unit 448 can execute the second software 452 for the driving assessment module 506 to calculate the driving profile 528 including the assessment events 524 based on the driving behavior 520. The second control unit 448 can execute the second software 452 for the scoring module 508 to generate the driving score 302, the compliance level 304, and the driving rating 306. The second control unit 448 can execute the second software 452 for the reports module 510 to generate reports and display the driving score 302, the compliance level 304, and the driving rating 306.

The navigation system 100 can be partitioned between the first software 412 and the second software 452. For example, the first software 412 can include the data collection module 502 and the compliance module 504. Based on the size of the first storage unit 404 of FIG. 4, the first software 412 can include additional modules partitioned on the first software 412 as previous described.

In a further example, the second software 452 can include the driving assessment module 506, the scoring module 508, and the reports module 510. The second control unit 448 can execute the modules partitioned on the second software 452 as previously described.

In another example, the first user interface 402 of FIG. 4 can receive a command by the driver to acquire the odometer reading 204. The first control unit 408 can operate the first position unit 422 of the first device 102 and the first location unit 406 of the first device 102 to provide the acceleration and location information for the driving behavior 520. The first control unit 408 can operate the first communication unit 410 of FIG. 4 to send the driving behavior 520 to the second device 106 over the communication path 104 of FIG. 4.

The second communication unit 450 of FIG. 4 can receive the driving behavior 520 from the first device 102. The second control unit 448 of FIG. 4 can calculate the driving profile 528 and the assessment events 524 and generate the driving score 302, the compliance level 304, and the driving rating 306. The second communication unit 450 can send the driving score 302, the compliance level 304, and the driving rating 306 to the first device 102 for display on the first display interface 202 of FIG. 4.

In yet another example, the data collection module 502, the compliance module 504, the driving assessment module 506, the scoring module 508, and the reports module 510 can be implemented with a circuit of the first device 102. In a further example, the data collection module 502, the compliance module 504, the driving assessment module 506, the scoring module 508, and the reports module 510 can be implemented with a circuit of the second device 106.

It has been discovered that the present invention provides increased accuracy and reliability by determining the compliance level 304 by comparing the total mileage to the mileage logged by the navigation system 100. By measuring the level of operational compliance, the navigation system 100 can measure driving performance more accurately and provide a more reliable indication of total risk.

It has been discovered the present invention provides safer driving performance by presenting the driving score 302, the compliance level 304, and the driving rating 306 with the first device 102 during vehicle operation. By providing feedback on the driving score 302, the compliance level 304, and the driving rating 306, the driver can alter the driving behavior 520, avoid risky driving actions, and increase the level of safe driving.

It has been discovered that the present invention provides increased functionality and expanded vehicle coverage by performing data collection on the first device 102. By operating the navigation system 100 with the first device 102, the data collection operation is decoupled from the vehicle itself and can be performed on different vehicles, allowing greater coverage and better quality data.

Figure 6:
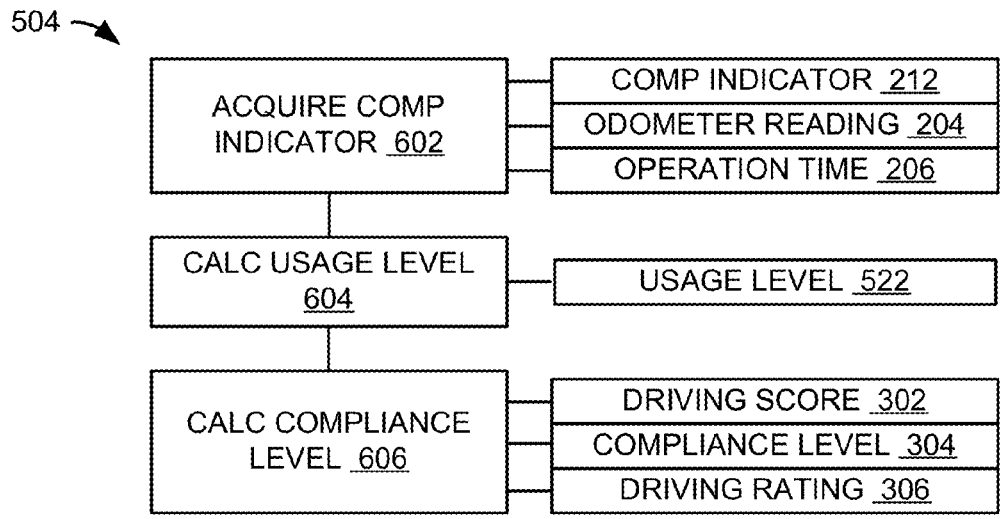
FIG. 6 is a control flow of the compliance module.

Referring now to FIG. 6, therein is shown a control flow of the compliance module 504. The compliance module 504 can acquire the compliance indicator 212, calculate the monitoring usage level 522, and calculate the compliance level 304. The compliance module 504 can include an acquire compliance indicator module 602, a calculate monitoring usage level module 604, and a calculate compliance level module 606.

In the control flow of the compliance module 504, as an example, each module is indicated by a number and successively higher module numbers follow one another. The control flow can pass from one module to the next higher numbered module unless explicitly otherwise indicated.

The compliance module 504 can be implemented in several different ways. For example, the compliance module 504 can be implemented as software modules running on the first control unit 408 of FIG. 4, as dedicated hardware modules, or a combination of hardware and software modules. In another example, the compliance module 504 can be implemented as a single module on a single unit, as distributed modules on separate units, or any combination thereof.

The compliance module 504 can include the acquire compliance indicator module 602. The acquire compliance indicator module 602 acquires the compliance indicator 212 to determine the level of the total usage 214 of FIG. 2 of the vehicle 216 of FIG. 2. The level of the total usage 214 can be determined by measuring the total mileage of the vehicle, the total operating time of the vehicle, or a combination thereof. The compliance indicator 212 can include the odometer reading 204, the operation time 206 of the vehicle, or a combination thereof. After the acquire compliance indicator module 602 has completed, the control flow can be transferred to the calculate monitoring usage level module 604.

The acquire compliance indicator module 602 can acquire the compliance indicator 212 in a variety of ways. For example, the acquire compliance indicator module 602 can acquire the compliance indicator 212 by measuring the mileage of the vehicle by obtaining the odometer reading 204. The odometer reading 204 can be acquired electronically, optically, mechanically, or a combination thereof.

In an illustrative example, the first device 102 of FIG. 1 can acquire the compliance indicator 212 by communicating with the odometer electronically and reading the odometer remotely. In another example, the first device 102 can acquire the odometer reading 204 by taking a digital picture of the odometer of the vehicle and determining the value using optical character recognition. In another illustrative example, the first device 102 can automatically acquire the odometer reading 204 electronically when the first device 102 is close enough to the odometer to form an electronic data connection.

The acquire compliance indicator module 602 can also acquire the compliance indicator 212 by measuring the operation time 206 of the vehicle. The operation time 206 can be the amount of time the vehicle has been operated. The operation time 206 can be the total usage 214 of the vehicle, the usage over a given interval, or a combination thereof. The operation time 206 can be determined in a variety of ways including measuring the amount of time the engine of the vehicle has been running, the amount of time the electronic systems of the vehicle are active, the current calendar age of the vehicle, or a combination thereof. The acquire compliance indicator module 602 can normalize the compliance indicator 212 to allow for consistent processing based on units of measurement, time intervals, or a combination thereof.

In yet another example, the acquire compliance indicator module 602 can acquire the compliance indicator 212 by communicating with the external system 208 of FIG. 2 including a maintenance system, a registration system, a traffic data system, or a combination thereof. The external system 208 can provide the compliance indicator 212 including the odometer reading 204 as recorded in the external system 208, the operation time 206 of the vehicle as indicated in the external system 208, or a combination thereof.

The compliance module 504 can include the calculate monitoring usage level module 604. The calculate monitoring usage level module 604 calculates the monitoring usage level 522 based on the operational information of the navigation system 100 of FIG. 1. After the calculate monitoring usage level module 604 has completed, the control flow can be transferred to the calculate compliance level module 606.

The monitoring usage level 522 can be a numerical value indicating the operational utilization of the navigation system 100. The monitoring usage level 522 can indicate the actual number of mile or hours the navigation system 100 monitored the vehicle. For example, the monitoring usage level 522 can represent the number of miles travelled in the vehicle with the navigation system 100 operating as measured by a GPS unit. In another example, the monitoring usage level 522 can represent the amount of time the navigation system 100 was operating. The monitoring usage level 522 can represent the navigation system 100 operation over an interval of time such as a day, week, month, quarter, year, or the lifetime of the vehicle.

The monitoring usage level 522 can be calculated in a variety of ways. For example, the monitoring usage level 522 can be provided by the navigation system 100. The navigation system 100 can record and provide the number of miles travelled with the navigation system 100 operational for a given interval of time. In another example, the navigation system 100 can provide the number of hours of operation for a given interval of time.

The compliance module 504 can include the calculate compliance level module 606. The calculate compliance level module 606 calculates the compliance level 304 by comparing the monitoring usage level 522 with the compliance indicator 212. The compliance level 304 can indicate the percentage usage of the navigation system 100 compared to the total usage 214 of the vehicle. The compliance level 304 can be used to measure the degree of use of the navigation system 100 and to scale the driving score 302 based on the operation of the vehicle.

The compliance level 304 can be calculated in a variety of ways including determining a percentage of the vehicle operating time, a percentage of vehicle distance travelled, percentage of driver operation time, percentage of driver distance travelled, or a combination thereof. For example, the compliance level 304 can be calculated by comparing the number of miles driven with the navigation system 100 operational to the total miles driven as indicated by the mileage indicated by the odometer. If the navigation system 100 was operation during 1000 miles of driving during the current month, and the odometer indicates that the vehicle was driven for a total of 2000 miles during the current month, then the compliance level 304 can be calculated to be 50% by dividing the 1000 miles under the navigation system 100 by the 2000 total miles as indicated by the odometer.

In one example, the acquire compliance indicator module 602, the calculate monitoring usage level module 604 and the calculate compliance level module 606 can be implemented with a circuit of the first device 102. In another example, the acquire compliance indicator module 602, the calculate monitoring usage level module 604 and the calculate compliance level module 606 can be implemented with a circuit of the second device 106 of FIG. 1.

It has been discovered that the present invention provides the navigation system 100 with an improved accuracy measurement of driving performance by calculating the driving rating 306 based on the driving score 302, the compliance level 304, the monitoring usage level 522, and the driving behavior 520 of FIG. 5. By scaling the driving score 302 with the compliance level 304, the navigation system 100 can give a higher value to the driving rating 306 for a driver (not shown) who more actively monitors the driving behavior 520. The higher the compliance level 304, the more accurately the driving score 302 will represent the actual driving performance.

Figure 7:
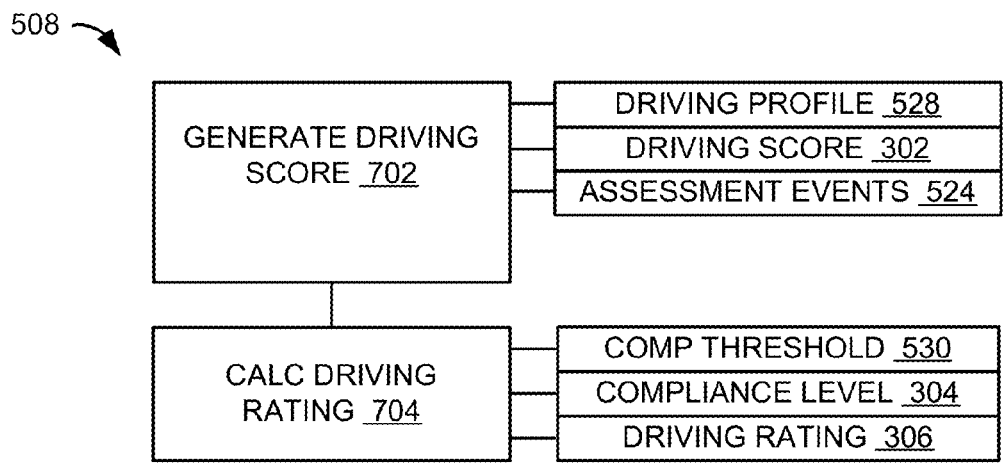
FIG. 7 is a control flow of the scoring module.

Referring now to FIG. 7, therein is shown a control flow of the scoring module 508. The scoring module 508 can calculate the driving rating 306 based on the driving score 302 and the compliance level 304. The scoring module 508 can include a generate driving score module 702 and a calculate driving rating module 704.

In the control flow of the scoring module 508, as an example, each module is indicated by a number and successively higher module numbers follow one another. The control flow can pass from one module to the next higher numbered module unless explicitly otherwise indicated.

The scoring module 508 can be implemented in several different ways. For example, the scoring module 508 can be implemented as software modules running on the first control unit 408 of FIG. 4, as dedicated hardware modules, or a combination of hardware and software modules. In another example, the scoring module 508 can be implemented as a single module on a single unit, as distributed modules on separate units, or any combination thereof.

The scoring module 508 can include the generate driving score module 702. The generate driving score module 702 generates the driving score 302 based on the driving profile 528 and the assessment events 524. After the generate driving score module 702 has completed, the control flow can be transferred to the calculate driving rating module 704.

The generate driving score module 702 can generate the driving score 302 in a variety of ways. For example, the driving score 302 can be generated by summing the assessment events 524 and scaling the result by a pre-defined factor to determine the driving score 302. If the driving profile 528 included only one of the assessment events 524 for speeding and ten instances of the assessment events 524 for driving at the speed limit, then the driving score 302 could be set to 100%–10%=90%.

In another example, the assessment events 524 can be sorted by type, severity and frequency to determine the driving score 302. If the driving profile 528 included four of the assessment events 524, with two of the assessment events 524 representing exceeding the speed limit and two of the assessment events 524 representing hard braking incidents, then the two speeding events could be ranked as being more serious than the two braking events. The driving score 302 can give a higher weight to the speeding events and a lower weight for the less serious braking events.

The scoring module 508 can include the calculate driving rating module 704. The calculate driving rating module 704 calculates the driving rating 306 based on the driving score 302 and the compliance level 304. The driving rating 306 can indicate the effective value for the driving score 302.

The driving rating 306 can be calculated based on the driving score 302 and the compliance level 304 in a variety of ways. For example, the driving rating 306 can be calculated by scaling the driving score 302 by the compliance level 304. If the driving score 302 is 90% and the compliance level is 100%, then the driving rating 306 can be 90%*100%=90. The driving rating 306 can be scaled based on driving score 302 and the compliance level 304 in a linear or non-linear fashion. In another example, if the driving score 302 is 90% and the compliance level is only 50%, then the driving rating 306 can be 90%*50%=45%.

In yet another example, the driving rating 306 can be calculated based on the compliance threshold 530. The compliance threshold 530 is defined as the minimum value of the compliance level 304 to qualify as fully compliant. If the compliance level 304 meets or exceeds the compliance threshold 530, then the compliance level 304 is set to 100% and the driving rating 306 is the same as the driving score.

The compliance threshold 530 can also be represented by multiple values to provide different tiers of compliance. The compliance threshold 530 has the effect of quantizing the compliance level 304 into discrete levels. The compliance threshold 530 can be varied as needed to achieve a desired result.

In an illustrative example, the compliance threshold 530 can be set to 80%, indicating that if the compliance level 304 is 80% or higher, the compliance level 304 will be set to 100% and the driving rating 306 will be the same as the driving score 302. This indicates that the navigation system 100 of FIG. 1 must be monitoring the vehicle 216 of FIG. 2 for at least 80% of the miles driven to receive the full value of the driving score 302 as expressed by the driving rating 306.

In one example, the generate driving score module 702 and the calculate driving rating module 704 can be implemented with a circuit of the first device 102 of FIG. 1. In a further example, the generate driving score module 702 and the calculate driving rating module 704 can be implemented with a circuit of the second device 106 of FIG. 1.

Figure 8:
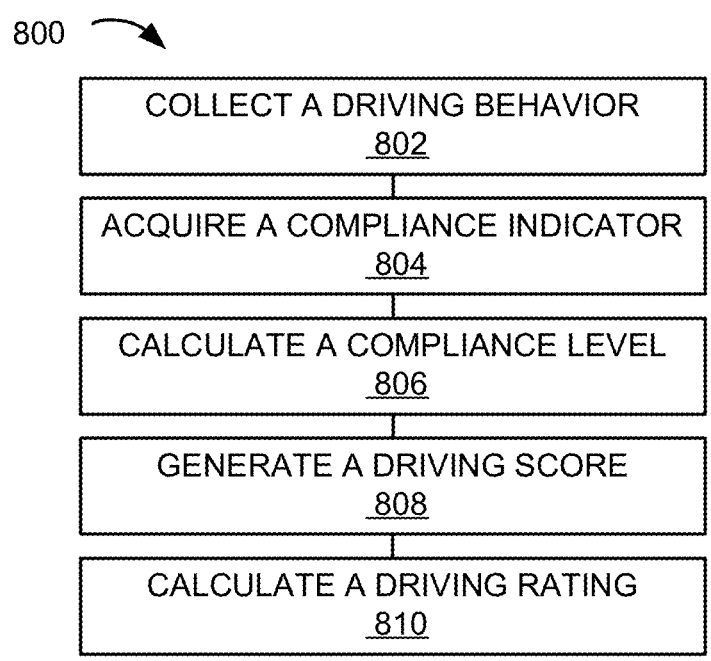
FIG. 8 is a flow chart of a method of operation of the navigation system in a further embodiment of the present invention.

Referring now to FIG. 8 therein is shown a flow chart of a method 800 of operation of the navigation system 100 in a further embodiment of the present invention. The method 800 includes: collecting a driving behavior for determining a driving profile of a vehicle in a block 802; acquiring a compliance indicator for measuring a total usage of the vehicle in a block 804; calculating a compliance level based on a monitoring usage level and the compliance indicator in a block 806; generating a driving score based on the driving profile having an assessment event detected based on the driving behavior in a block 808; and calculating a driving rating based on the driving score and the compliance level for displaying on a device in a block 810.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another aspect of the present invention is that it valuably supports and services the historical trend of reducing costs, simplifying systems, increasing performance, and enhancing safety. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    collecting a driving behavior for determining a driving profile of a vehicle;
    acquiring a compliance indicator for measuring a total usage of the vehicle;
    calculating a compliance level based on a monitoring usage level and the compliance indicator;
    generating a driving score based on the driving profile having an assessment event detected based on the driving behavior; and
    calculating a driving rating based on the driving score and the compliance level for displaying on a device.

2. The method as claimed claim 1 wherein acquiring the compliance indicator includes receiving an odometer reading.

3. The method as claimed in claim 1 wherein calculating the compliance level includes scaling the compliance indicator with the monitoring usage level.

4. The method as claimed in claim 1 wherein calculating the driving rating includes comparing a compliance threshold to the compliance level for calculating the driving rating based on the compliance level being greater than or equal to the compliance threshold.

5. The method as claimed in claim 1 wherein calculating the driving rating includes varying a compliance threshold.

6. A method of operation of a navigation system comprising:
    collecting a driving behavior for determining a driving profile of a vehicle;
    acquiring a compliance indicator for measuring a total usage of the vehicle;
    calculating a compliance level based on the monitoring usage level and the compliance indicator;
    identifying an assessment event based on the driving behavior and a driving assessment rule;
    generating a driving score based on the driving profile having the assessment event; and
    calculating a driving rating based on the driving score and the compliance level for displaying on a device.

7. The method as claimed in claim 6 wherein collecting the driving behavior includes measuring an acceleration in the device.

8. The method as claimed in claim 6 wherein acquiring the compliance indicator includes receiving the compliance indicator from an external system.

9. The method as claimed in claim 6 wherein acquiring the compliance indicator includes receiving an operation time.

10. The method as claimed in claim 6 wherein calculating the compliance level includes calculating the compliance level by scaling the monitoring usage level by the compliance indicator.

11. A navigation system comprising:
    a data collection module for collecting a driving behavior for determining a driving profile;
    a compliance module, coupled to the data collection module, for acquiring a compliance indicator;
    a calculate compliance level module, coupled to the compliance module, for calculating a compliance level based on a monitoring usage level and the compliance indicator;
    a scoring module, coupled to the compliance module, for generating a driving score based on the driving profile having an assessment event detected based on the driving behavior; and
    a calculate driving rating module, coupled to the scoring module, for calculating a driving rating based on the driving score and the compliance level for displaying on a device.

12. The system as claimed in claim 11 wherein the data collection module, coupled to the compliance module, is for receiving an odometer reading.

13. The system as claimed in claim 11 further comprising a control unit, coupled to the compliance module, is for calculating the compliance level including scaling the compliance indicator with the monitoring usage level.

14. The system as claimed in claim 11 further comprising a control unit, coupled to the scoring module, is for determining a compliance threshold is less than or equal to the compliance level for calculating the driving rating.

15. The system as claimed in claim 11 further comprising a storage unit, coupled to the calculate driving rating module, is for calculating the driving rating including varying a compliance threshold.

16. The system as claimed in claim 11 further comprising:
    a driving assessment module, coupled to the data collection module, for comparing a driving assessment rule to the driving behavior to identify the assessment event.

17. The system as claimed in claim 16 further comprising a position unit, coupled to the data collection module, for measuring an acceleration in the device.

18. The system as claimed in claim 16 further comprising a communication unit, coupled to the data collection module, for communicating with an external system to acquire the compliance indicator including receiving the compliance indicator.

19. The system as claimed in claim 16 further comprising a communication unit, coupled to the data collection module, for acquiring the compliance indicator including receiving an operation time.

20. The system as claimed in claim 16 further comprising a storage unit, coupled to the driving assessment module, for calculating the compliance level by scaling the monitoring usage level by the compliance indicator.

* * * * *